(12) United States Patent
Burt et al.

(10) Patent No.: US 11,034,353 B2
(45) Date of Patent: Jun. 15, 2021

(54) VEHICLE AND REGENERATIVE BRAKING CONTROL SYSTEM FOR A VEHICLE

(71) Applicant: FORD GLOBAL TECHNOLOGIES, LLC, Dearborn, MI (US)

(72) Inventors: Andrew E. Burt, Royal Oak, MI (US); Kendrick Morrison, Wayne, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 469 days.

(21) Appl. No.: 16/131,153

(22) Filed: Sep. 14, 2018

(65) Prior Publication Data
US 2020/0086874 A1    Mar. 19, 2020

(51) Int. Cl.
| | |
|---|---|
| B60W 10/00 | (2006.01) |
| B60W 30/18 | (2012.01) |
| B60L 7/18 | (2006.01) |
| B60W 10/02 | (2006.01) |
| B60W 10/184 | (2012.01) |
| B60W 10/08 | (2006.01) |
| B60W 20/00 | (2016.01) |
| B60L 7/26 | (2006.01) |

(52) U.S. Cl.
CPC ......... *B60W 30/18127* (2013.01); *B60L 7/18* (2013.01); *B60L 7/26* (2013.01); *B60W 10/023* (2013.01); *B60W 10/08* (2013.01); *B60W 10/184* (2013.01); *B60W 20/00* (2013.01); *B60W 2510/0241* (2013.01); *B60W 2710/025* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 9,145,128 B2 | 9/2015 | Wang et al. | |
| 9,475,495 B2 | 10/2016 | Nefcy et al. | |
| 2010/0138127 A1* | 6/2010 | Boughtwood | ...... B60L 15/2009 |
| | | | 701/71 |
| 2017/0259670 A1 | 9/2017 | Kuang et al. | |
| 2017/0327102 A1* | 11/2017 | Yamazaki | ........... F02D 41/0215 |

* cited by examiner

*Primary Examiner* — James M McPherson
(74) *Attorney, Agent, or Firm* — David B Kelley; Brooks Kushman P.C.

(57) ABSTRACT

A vehicle includes a torque converter bypass clutch, a wheel, a generator, and a controller. The torque converter bypass clutch is disposed between the wheel and the electric machine. The controller is programmed to, responsive to slip of the clutch exceeding a threshold during regenerative braking, energize the electric machine such that a torque being transferred from the wheel to the electric machine increases at a first rate and increase clutch pressure to decrease the slip. The controller is further programmed to, responsive to the slip decreasing to less than the threshold during the regenerative braking, adjust electric machine energization such the that torque being transferred from the wheel to the electric machine increases at a second rate that is greater than the first rate.

20 Claims, 3 Drawing Sheets

VEHICLE AND REGENERATIVE BRAKING CONTROL SYSTEM FOR A VEHICLE

TECHNICAL FIELD

The present disclosure relates to hybrid/electric vehicles and regenerative braking control systems for hybrid/electric vehicles.

BACKGROUND

Hybrid/electric vehicles may include electric machines that are configured to convert kinetic energy into electrical energy via regenerative braking.

SUMMARY

A vehicle includes a torque converter bypass clutch, a wheel, a generator, and a controller. The torque converter bypass clutch is disposed between the wheel and the generator. The controller is programmed to, responsive to slip of the clutch exceeding a threshold during regenerative braking, increase at a first rate current exciting coils of the generator. The controller is further programmed to, responsive to the slip decreasing to less than the threshold during the regenerative braking, increase at a second rate, that is greater than the first rate, the current.

A vehicle control method includes increasing current exciting generator coils at a first rate responsive to slip of a torque converter bypass clutch, that is disposed between a wheel and a generator, exceeding a threshold during regenerative braking and increasing the current at a second rate, that is greater than the first rate, responsive to the slip decreasing to less than the threshold during regenerative braking.

A vehicle includes a torque converter bypass clutch, a wheel, a generator, and a controller. The torque converter bypass clutch is disposed between the wheel and the electric machine. The controller is programmed to, responsive to slip of the clutch exceeding a threshold during regenerative braking, energize the electric machine such that a torque being transferred from the wheel to the electric machine increases at a first rate and increase clutch pressure to decrease the slip. The controller is further programmed to, responsive to the slip decreasing to less than the threshold during the regenerative braking, adjust electric machine energization such the that torque being transferred from the wheel to the electric machine increases at a second rate that is greater than the first rate.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
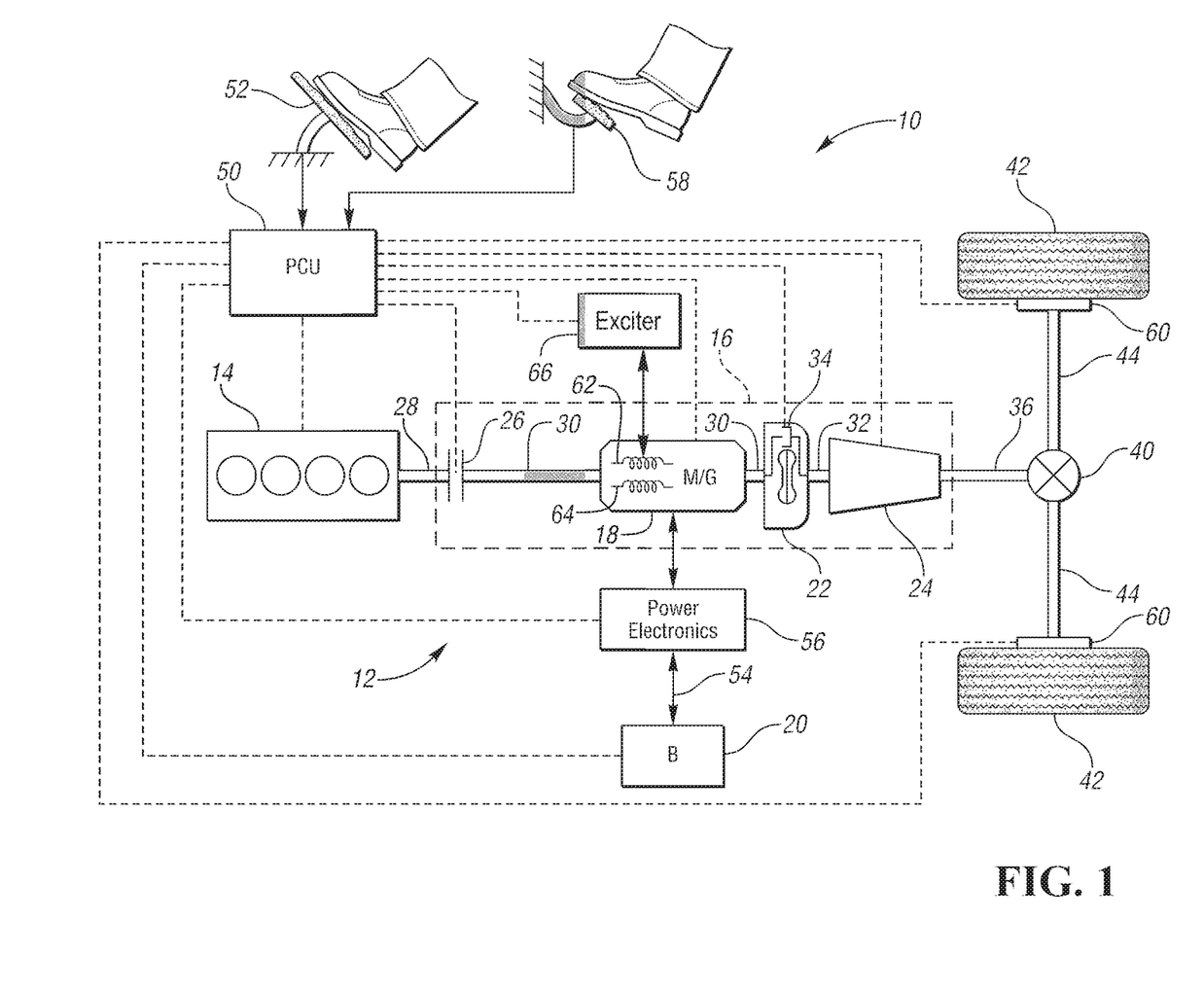
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24.The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

When operating as a generator, electric coils 62 of a rotor of the M/G 18 are energized by an electric current to generate a magnetic field. The generated magnetic field then induces an electric current into coils 64 of a stator of the M/G 18. The electric current generated in the coils 64 of the stator is then utilized to recharge the battery 20 or to power various other vehicle devices or accessories. The electricity being generated may be directed from the coils 64 of the stator to the battery 20 or to other various devices via the power electronics 54. An Exciter 66 may be configured to direct electrical current to the coils 62 of the rotor in order to excite the coils 62 of the rotor. The exciter 66 may include an integral power source, such as a separate battery, or may receive power from another component of the vehicle 10 such as battery 20 or an alternator (not shown). The strength of the magnetic field which is generated when the coils 62 of the rotor are excited increases proportionally to the amount excitation current (i.e., the current generated by the exciter 66 to excite the coils 62 of the rotor). The voltage of the electric current induced into the coils 64 of a stator in turn increases proportionally to an increase strength of the magnetic field which is generated by the coils 62 of the rotor when excited. The torque that must be applied rotate the rotor of the M/G 18 is also directly proportional to the electric current induced into the coils 64 of a stator and may be represented by equations (1-4):

$$\tau = NIAB\sin\theta \quad (1)$$

$$B = \frac{MuI}{2\pi d} \quad (2)$$

$$\tau = \frac{\varepsilon I}{\omega} \quad (3)$$

$$\varepsilon = NBA\omega\sin(\omega t) \quad (4)$$

where $\tau$ is the torque that is being applied to the M/G 18 when operating as a generator, N is the number of loops in the coils 62 of the rotor, I is the electric current being applied to the coils 62 of the rotor, A is the area of the coils 62 of the rotor, B is the strength of the magnetic field being generated by the coils 62 of the rotor, $\theta$ is the angle between the magnetic field and the normal to the coils 62 of the rotor, Mu is the magnetic permeability of free space, d is the distance of the magnetic field from the magnetic source (i.e., the coils of the rotor 62), ε is the motional electromotive force that is induced, and ω is the rotational speed of the rotor.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figures 2, 3:
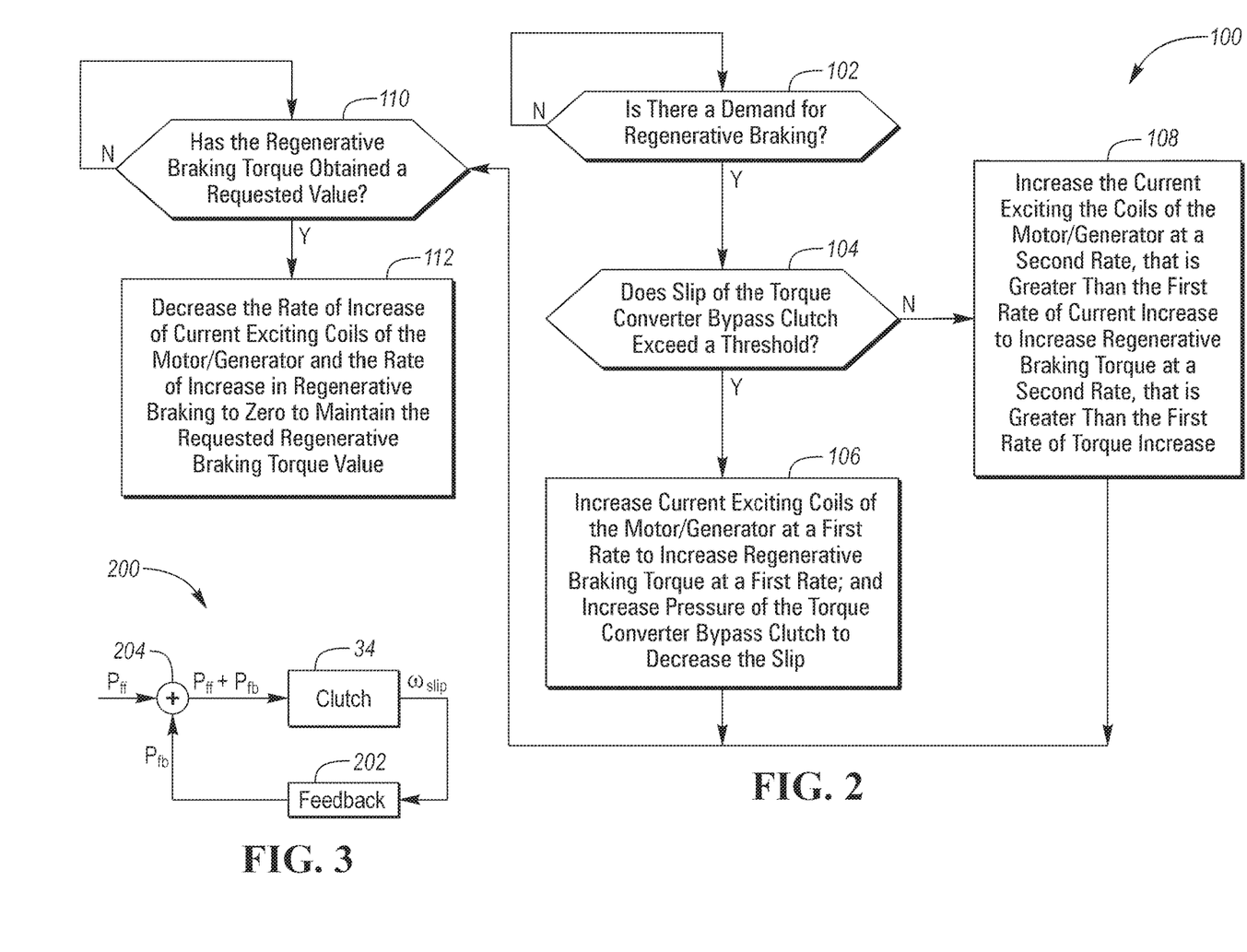
FIG. 2 is a flowchart illustrating a method of controlling a regenerative braking system of the vehicle.
FIG. 3 is a torque converter bypass clutch control diagram.

Referring to FIG. 2, a method 100 of controlling the regenerative braking system of the vehicle 10 is illustrated. The method 100 may be stored as control logic and/or an algorithm within the controller 50. The controller 50 may implement the method 100 by controlling the various components of the vehicle 10. The method 100 is initiated at block 102, where it is determined if there is a demand for regenerative braking. If there is not a demand for regenerative braking, the method 100 recycles backs to the beginning of block 102. If there is a demand for regenerative braking, the method 100 moves on to block 104.

At block 104, it is determined if the slip of the torque converter bypass clutch 34 (i.e., the speed difference between the opposing sides of the torque converter bypass clutch 34) exceeds a threshold value. The torque converter bypass clutch 34 is configured to close in order to transfer power and torque from the drive wheels 42 to the M/G 18 during regenerative braking. During regenerative braking, kinetic energy of the moving vehicle 10 is recaptured via the M/G 18, which operates as a generator to recharge battery 20 or to power other various devices within the vehicle 10. If the slip of the torque converter bypass clutch 34 does exceed the threshold value, the method 100 moves on to block 106.

At block 106, coils of the M/G 18 are energized at a first rate in order to increase the regenerative braking power and torque that are being transferred from the drive wheels 42 back to the M/G 18. More specifically at block 106, the electric current that is being delivered from the exciter 66 to the coils 62 of the rotor of the M/G 18 is increased at a first rate in order to increase the regenerative braking torque at a first rate.

Also, at block 106, the pressure of the torque converter bypass clutch 34 is increased in order to decrease the slip of the torque converter bypass clutch 34. More specifically, at block 106, a feedback loop (which may be a subcomponent of the controller 50) may be configured to increase the pressure of the torque converter bypass clutch 34 based on the speed difference between the opposing sides of the torque converter bypass clutch 34 (i.e., the slip of the torque converter bypass clutch 34). The feedback loop may be configured to increase the pressure of the torque converter bypass clutch 34 at block 106 until a zero slip value of the torque converter bypass clutch 34 is obtained. The torque converter bypass clutch 34 may be a hydraulic clutch, and the pressure of the torque converter bypass clutch 34 may correspond to the pressure of hydraulic fluid on an apply side of the torque converter bypass clutch 34 that forces the opposing sides of the torque converter bypass clutch 34 into contact with each other.

Returning to block 104, if it is determined that the slip of the torque converter bypass clutch 34 does not exceed the threshold value, the method 100 moves on to block 108. At block 108 the coils of the M/G 18 are energized at a second rate, that is greater than the first rate of energization that occurs at block 106, in order to increase the regenerative braking power and torque that are being transferred from the drive wheels 42 back to the M/G 18. More specifically at block 108, the electric current that is being delivered from the exciter 66 to the coils 62 of the rotor of the M/G 18 is increased at a second rate, that is great than the first rate of current increase that occurs at block 106, in order to increase the regenerative braking torque at a second rate, that is greater than the first rate of torque increase that occurs at block 106.

Method 100 may continue to monitor the slip of the torque converter bypass clutch at block 104 while the current exciting the coils and the regenerative braking torque that is being transferred to the M/G 18 are being increased at either block 106 or 108. Specifically, the method 100 may be configured to switch between blocks 106 and 108 depending on the slip of the torque converter bypass clutch 34 that is being monitored according to block 104. More specifically, the method 100 may switch from block 106 to block 108 in the event that the slip of the torque converter bypass clutch 34 transitions from being less than the threshold to being greater than the threshold, and to switch from block 108 to block 106 in the event that the slip of the torque converter bypass clutch 34 transitions from being greater than the threshold to being less than the threshold.

Also, while the current exciting the coils and the regenerative braking torque that is being transferred to the M/G 18 are being increased at either block 106 or 108, the method 100 may determine whether or not the regenerative braking torque has obtained a requested or commanded value at block 110, and if the current being delivered from the exciter 66 to the coils 62 of the rotor of the M/G 18 has obtained an associated requested or commanded excitation current to maintain the requested or commanded value of regenerative braking torque at block 110. If the regenerative braking torque has not obtained the requested or commanded value, the method 100 recycles back through block 110 and continues to compare a current value of the regenerative braking torque with the requested or commanded value of the regenerative braking torque, while also simultaneously increasing the current exciting the coils and the regenerative braking torque that is being transferred from the drive wheels 42 to the M/G 18, according to either block 106 or 108.

If the regenerative braking torque that is being transferred from the drive wheels 42 to the M/G 18 has obtained the requested torque value at block 110, the method 100 moves on to block 112 where the energization of the coils of the M/G 18 are adjusted to maintain the requested torque value. More specifically at block 112, the rate of increase of the electric current that is being delivered from the exciter 66 to the coils 62 of the rotor of the M/G 18 and the rate of increase in the regenerative braking torque that is being transferred from the drive wheels 42 to the M/G 18 (of each which may be increasing according to either block 106 or block 108) are decreased to zero in order to maintain the requested or commanded value of the regenerative braking torque and the associated requested or commanded excitation current being delivered from the exciter 66 to the coils 62 of the rotor of the M/G 18 to maintain the requested or commanded value of regenerative braking torque. It should be understood that the flowchart in FIG. 2 is for illustrative purposes only and that the method 100 should not be construed as limited to the flowchart in FIG. 2. Some of the steps of the method 100 may be rearranged while others may be omitted entirely.

Referring to FIG. 3, the control diagram 200 of the torque converter bypass clutch 34 is illustrated. The control diagram 200 illustrates the control system that is configured to adjust the pressure that is applied to the torque converter bypass clutch 34 during regenerative braking. A commanded or feedforward pressure, $P_{ff}$, is delivered to the torque converter bypass clutch 34. The torque converter bypass clutch 34 outputs a slip speed (i.e., the speed difference between the opposing sides of the torque converter bypass clutch 34), $\omega_{slip}$. The slip speed, $\omega_{slip}$, may be measured by speed sensors that are disposed on the opposing sides of the torque converter bypass clutch 34. The slip speed, $\omega_{slip}$, is fed into a feedback loop or feedback controller 202, which outputs an adjusted or feedback pressure, $P_{fb}$. The feedback controller 202 may be any type of feedback controller, including a controller that has a proportional term, an integral term, and/or a derivative term. For example, the feedback controller 202 may be a proportional integral (PI) controller or a proportional integral derivative (PID) controller. The feedforward pressure, $P_{ff}$, and the feedback pressure, $P_{fb}$, are then fed into summation node 204. The summation of the feedforward pressure, $P_{ff}$, and the feedback pressure, $P_{fb}$, is then commanded to the torque converter bypass clutch 34.

Figure 4:
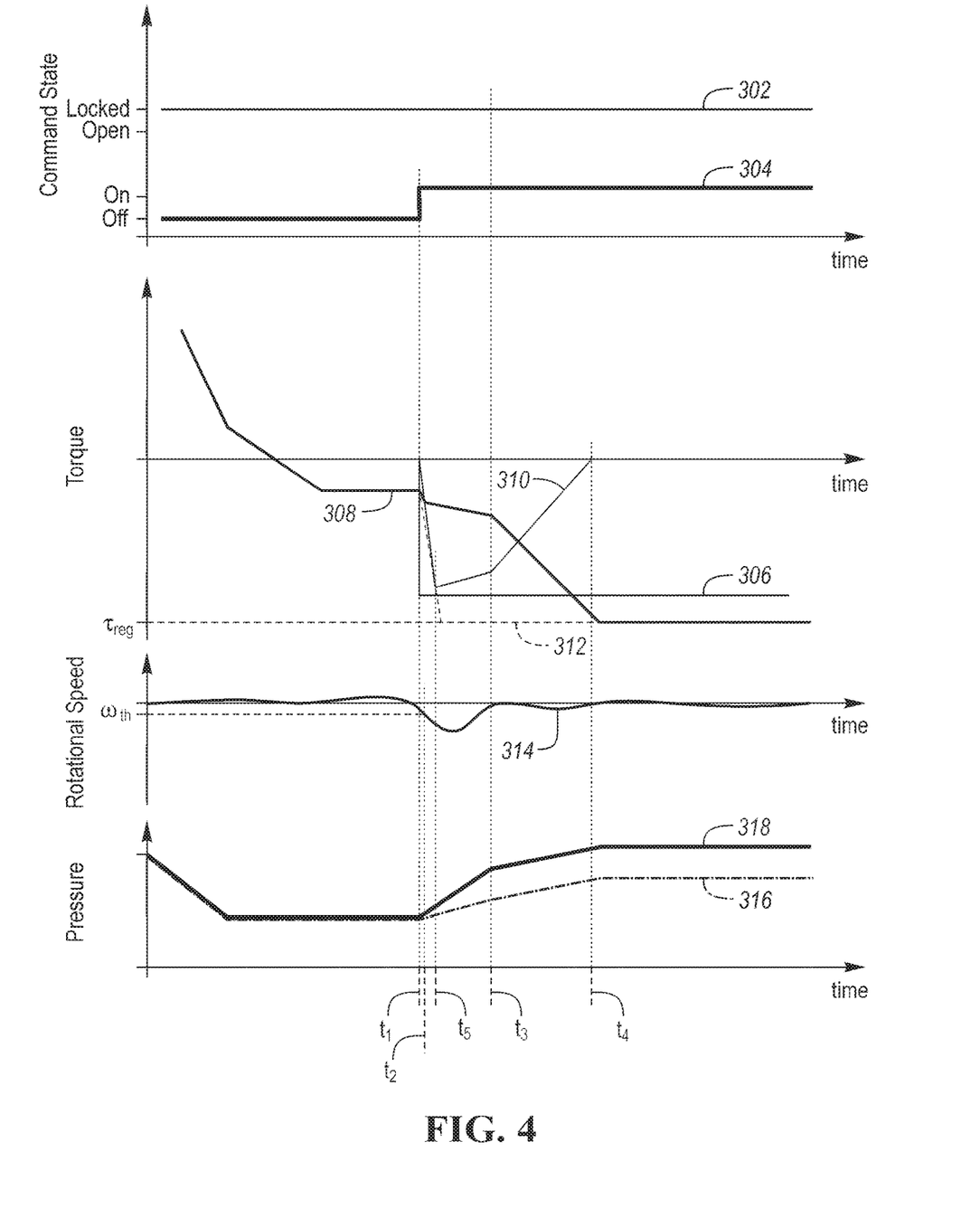
FIG. 4 includes graphs illustrating torque control of a motor/generator during regenerative braking, torque control of friction brakes during regenerative braking, and speed control of a torque converter bypass clutch during regenerative braking.

Referring to FIG. 4, graphs representative of torque control of the M/G 18 during regenerative braking, torque control of the friction brakes 60 during regenerative braking, and speed control of the torque converter bypass clutch 34 during regenerative braking are illustrated. The graphs illustrated in FIG. 4 are representative of various states of subcomponents of the vehicle that are being controlled according to method 100. A commanded state of the torque converter bypass clutch 34 (i.e., whether the torque converter bypass clutch 34 is being commanded to be open or locked) is illustrated by line 302, a driver brake request is illustrated by line 304, a total regenerative braking torque request (i.e., a requested torque to be transferred from the drive wheels 42 to the M/G 18) is illustrated by line 306, a filtered or controlled regenerative braking torque (a controlled torque value that increases the torque transferred from the drive wheels 42 to the M/G 18 according to method 100 to eventually obtain the total regenerative braking torque request 306) is illustrated by line 308, a friction braking torque is illustrated by line 310, a total braking demand is represented by line 312, a slip speed of the torque converter bypass clutch 34 (i.e., the speed difference between the opposing sides of the torque converter bypass clutch 34) is represented by line 314, the feedforward pressure, $P_{ff}$, command to the torque converter bypass clutch 34 is represented by line 316, and the sum of the feedforward pressure command, $P_{ff}$, and the feedback pressure command, $P_{fb}$, to the torque converter bypass clutch 34 is represented by line 318.

The total regenerative braking torque request 306, the controlled regenerative braking torque 308, the friction braking torque 310, the total braking demand 312, and the slip speed of the torque converter bypass clutch 314 are all shown to have negative values in FIG. 4. However, it should be understood that the descriptions of the regenerative braking torque request 306, the controlled regenerative braking torque 308, the friction braking torque 310, the total braking demand 312, and the slip speed of the torque converter bypass clutch 314 are all made with respect to their absolute values. Therefore, any increase in value refers to an increase in the negative value and away from a zero value, and any decrease in value refers to a decrease in negative value and toward a zero value.

At time $t_1$ the operator of the vehicle 10 depresses the brake pedal 58 resulting in a generating the total regenerative braking torque request 306, which is shown to have a constant value starting at time $t_1$. In response to the total regenerative braking torque request 306 and slip speed of the torque converter bypass clutch 314 being less than a threshold value, $\omega_{th}$, the controlled regenerative braking torque 308 is increased at an increased rate (e.g., the second rate described in block 108 of method 100 that is associated with the second and increased rate of electric current that is being delivered from the exciter 66 to the coils 62 of the rotor of the M/G 18) between times $t_1$ and $t_2$. After time $t_2$, the controlled regenerative braking torque 308 is increased at a decreased (e.g., the first rate described in block 106 that is associated with the first and decreased rate of electric current that is being delivered from the exciter 66 to the coils 62 of the rotor of the M/G 18) in response to the slip speed of the torque converter bypass clutch 314 exceeding the threshold value, $\omega_{th}$.

Also, after time $t_2$, the pressure applied to the torque converter bypass clutch 34 is increased from the feedforward pressure command, $P_{ff}$, to the sum of the feedforward pressure command, $P_{ff}$, and the feedback pressure command, $P_{fb}$, which is determined by the feedback control method described with respect to FIG. 3. The pressure of the torque converter bypass clutch 34 continues to increase according to the sum of the feedforward pressure command, $P_{ff}$, and the feedback pressure command, $P_{fb}$, until time $t_3$ where it is determined that the slip speed of the torque converter bypass clutch 314 has been reduced to less than the threshold value, $\omega_{th}$, or to zero.

Starting at time $t_3$ the controlled regenerative braking torque 308 returns to increasing at an increased rate (e.g., the second rate described in block 108) in response to the slip speed of the torque converter bypass clutch 314 being reduced to less than the threshold value, $\omega_{th}$, or to zero. The controlled regenerative braking torque 308 continues to increase at an increased rate from time $t_3$ until time $t_4$, where the controlled regenerative braking torque 308 obtains the requested or commanded value, $\tau_{req}$. Please note that the requested or commanded value, $\tau_{req}$, of the controlled regenerative braking torque 308 is slightly more than, as opposed to being equal to, the total regenerative braking torque request 306. This may occur under a scenario where additional torque is being transferred to the engine 14 during engine braking. Under a scenario where no engine braking is present, the requested or commanded value, $\tau_{req}$, of controlled regenerative braking torque 308 may be equal to the total regenerative braking torque request 306.

After time $t_3$, the pressure applied to the torque converter bypass clutch 34 is increased in order to increase the capacity of the torque converter bypass clutch 34 such that the torque converter bypass clutch 34 may transfer the increasing controlled regenerative braking torque 308 through to the M/G 18 without returning to a slipping state. The pressure applied to the torque converter bypass clutch 34 is increased only according to the feedforward pressure command, $P_{ff}$, after time $t_3$. The pressure of the torque converter bypass clutch 34 is not show to further increase via the feedback pressure command, $P_{fb}$, because the torque converter bypass clutch 34 remains locked after time $t_3$ negating the need to further increase the pressure above the feedforward pressure command, $P_{ff}$. It should be noted, however, that the increase in pressure that occurred via the feedback pressure command, $P_{fb}$, between times $t_2$ and $t_3$ is maintained at a constant value after time $t_3$, which corresponds to where the torque converter bypass clutch 34 ceased to slip.

Between times $t_1$ and $t_5$, the friction braking torque 310 is ramped up (i.e., increased) to supplement the increasing controlled regenerative braking torque 308 such the friction braking torque 310 and controlled regenerative braking torque 308 are able to satisfy the total braking demand 312. Between times $t_5$ and $t_3$, the friction braking torque 310 is decreased at a first rate in response to the controlled regenerative braking torque 308 increasing at the decreased (e.g., the first rate described in block 106 that is associated with the first and decreased rate of electric current that is being delivered from the exciter 66 to the coils 62 of the rotor of the M/G 18). Between times $t_3$ and $t_4$, the friction braking torque 310 is decreased at a second rate, that is greater than the first rate of decrease in friction brake toque 310, in response to the controlled regenerative braking torque 308 increasing at the increased rate (e.g., the second rate described in block 108 that is associated with the second and increased rate of electric current that is being delivered from the exciter 66 to the coils 62 of the rotor of the M/G 18). At time $t_4$ and afterwards, the friction braking torque 310 is shown to have a value of zero because the controlled regenerative braking torque 308 is satisfying the total braking demand 312 alone. It should be noted that between times $t_5$ and $t_4$ the friction braking torque 310 is decreased in proportion to any increase in the controlled regenerative braking torque 308 such that the summation of the controlled regenerative braking torque 308 and friction braking torque 310 satisfy and are equal to the total braking demand 312.

It should be understood that the designations of first, second, third, fourth, etc. for any threshold, increase, or decrease relative to regenerative braking torque, rate of change in regenerative braking torque, excitation current delivered to the M/G 18, rate of change in excitation current delivered to the M/G 18, pressure of the torque converter bypass clutch 34, slip of the torque converter bypass clutch 34, or any other metric or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
 a torque converter bypass clutch disposed between a wheel and a generator; and
 a controller programmed to,
  responsive to slip of the clutch exceeding a threshold during regenerative braking, increase at a first rate current exciting coils of the generator, and
  responsive to the slip decreasing to less than the threshold during the regenerative braking, increase at a second rate greater than the first rate the current.

2. The vehicle of claim 1, wherein the controller is further programmed to, responsive to the slip exceeding the threshold, increase clutch pressure to decrease the slip.

3. The vehicle of claim 1, wherein the controller is further programmed to, responsive to the current increasing at the second rate to a requested value, reduce the rate of increase of the current to zero and maintain the requested value.

4. The vehicle of claim 1, wherein the controller includes a feedback loop that is configured to increase the clutch pressure based on the slip.

5. The vehicle of claim 4, wherein the feedback loop is configured to adjust the clutch pressure to obtain a slip value of zero.

6. The vehicle of claim 1 further comprising friction brakes, wherein the controller is further programmed to, responsive to a torque being transferred from the wheel to the generator increasing at a third rate that corresponds with increasing the current at the first rate, decrease a friction brake torque at a fourth rate.

7. The vehicle of claim 6, wherein the controller is further programmed to, responsive to the torque being transferred from the wheel to the current increasing at a fifth rate that corresponds with increasing the current at the second rate, decrease the friction brake torque at a sixth rate that is greater than the fourth rate.

8. A vehicle control method comprising:
 responsive to slip of a torque converter bypass clutch, that is disposed between a wheel and a generator, exceeding a threshold during regenerative braking, increasing current exciting generator coils at a first rate, and
 responsive to the slip decreasing to less than the threshold during regenerative braking, increasing the current at a second rate greater than the first rate.

9. The method of claim 8 further comprising:
 responsive to the slip exceeding the threshold, increasing clutch pressure to decrease the slip.

10. The method of claim 8 further comprising:
 responsive to the current increasing at the second rate to a requested value, reducing the rate of increase of the current to zero and maintain the requested value.

11. The method of claim 8 further comprising:
 increasing the clutch pressure via a feedback loop based on the slip.

12. The method of claim 11, wherein the feedback loop is configured to adjust the clutch pressure to obtain a slip value of zero.

13. The method of claim 8 further comprising:
 responsive to a torque being transferred from the wheel to the generator increasing at third rate that corresponds with increasing the current at the first rate, decreasing a friction brake torque at a fourth rate.

14. The method of claim 13 further comprising:
 responsive to the torque being transferred from the wheel to the generator increasing at a fifth rate that corresponds with increasing the current at the second rate, decreasing the friction brake torque at a sixth rate that is greater than the fourth rate.

15. A vehicle comprising:
 a torque converter bypass clutch disposed between a wheel and an electric machine; and
 a controller programmed to, responsive to slip of the clutch exceeding a threshold during regenerative braking, energize the electric machine such that a torque being transferred from the wheel to the electric machine increases at a first rate, and increase clutch pressure to decrease the slip, and responsive to the slip decreasing to less than the threshold during the regenerative braking, adjust electric machine energization such the that torque being transferred from the wheel to the electric machine increases at a second rate that is greater than the first rate.

16. The vehicle of claim 15, wherein the controller is further programed to, responsive to the torque being transferred from the wheel to the electric machine increasing at the second rate to a requested torque value, adjust electric machine energization to maintain the requested torque value.

17. The vehicle of claim 15, wherein the controller includes a feedback loop that is configured to increase the clutch pressure based on the slip.

18. The vehicle of claim 17, wherein the feedback loop is configured to adjust the clutch pressure to obtain a slip value of zero.

19. The vehicle of claim 15 further comprising friction brakes, wherein the controller is further programmed to, responsive to the torque being transferred from the wheel to the electric machine increasing at the first rate, decrease a friction brake torque at a third rate.

20. The vehicle of claim 19, wherein the controller is further programmed to, responsive to the torque being transferred from the wheel to the electric machine increasing at the second rate, decrease the friction brake torque at a fourth rate that is greater than the third rate.

* * * * *